DIGITAL SPEECH INTERPOLATION COMMUNICATION SYSTEM
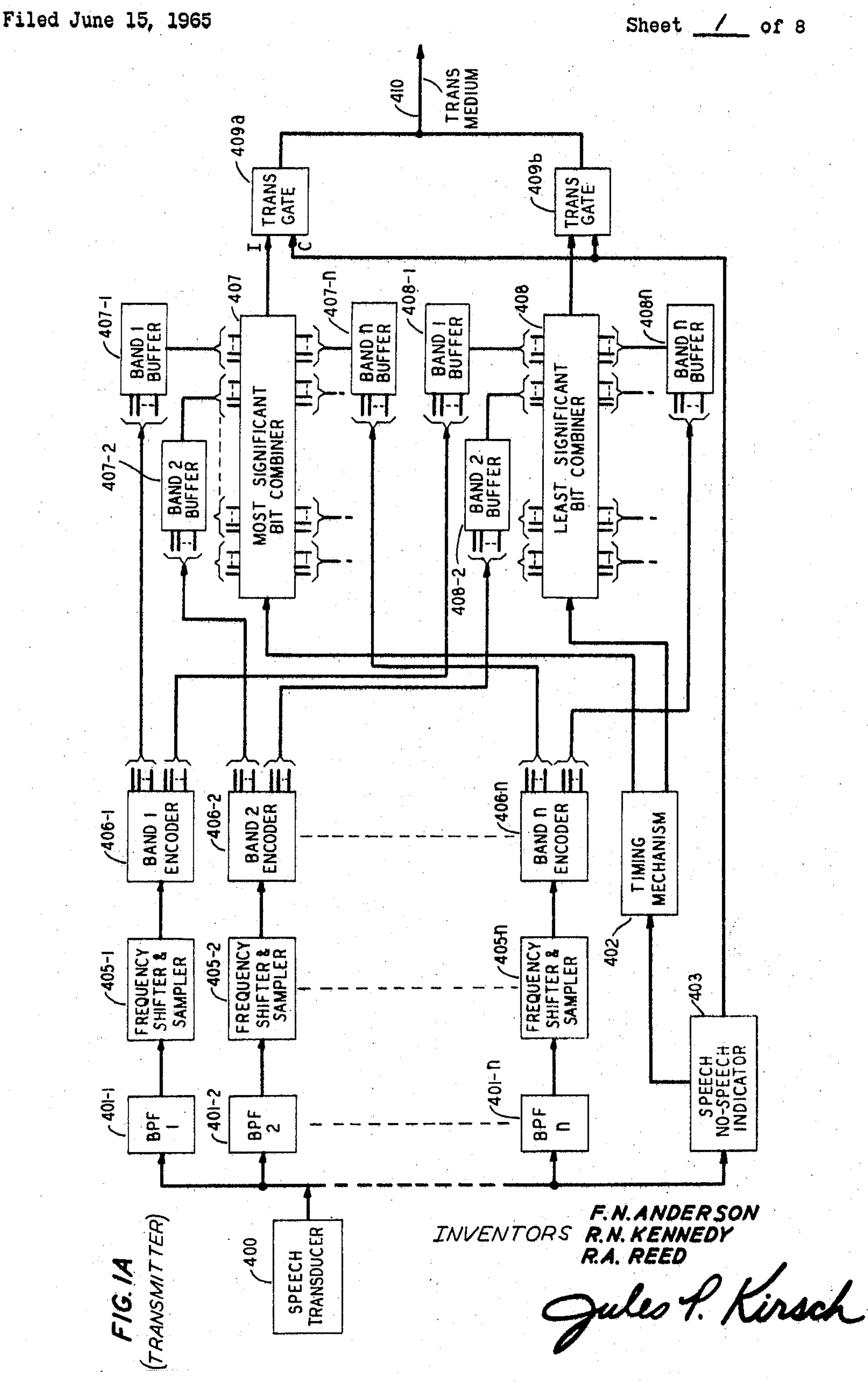
FIG. 1A (TRANSMITTER)
INVENTORS F. N. ANDERSON
R. N. KENNEDY
R. A. REED
Jules P. Kirsch

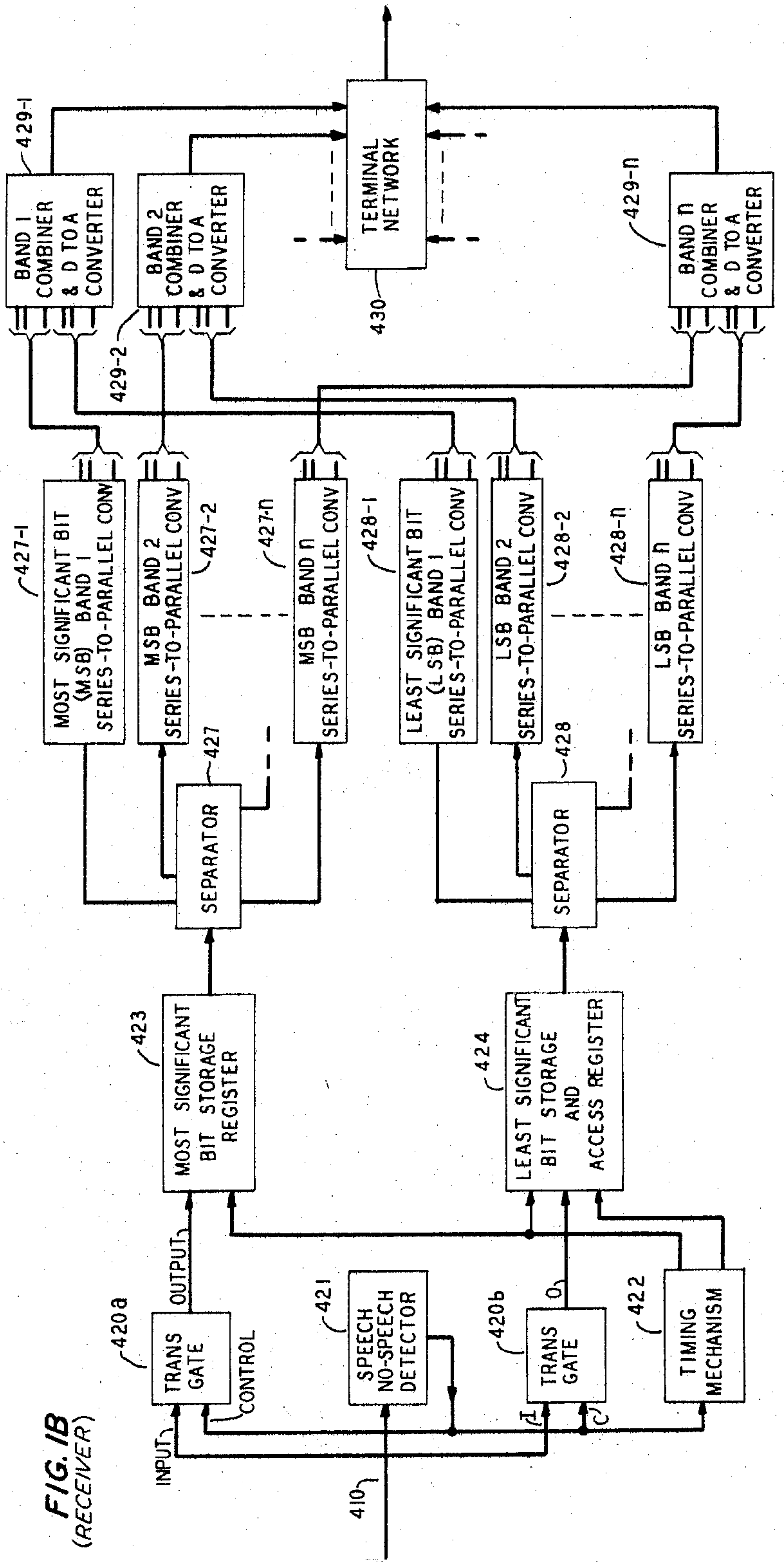
FIG. 1B (RECEIVER)

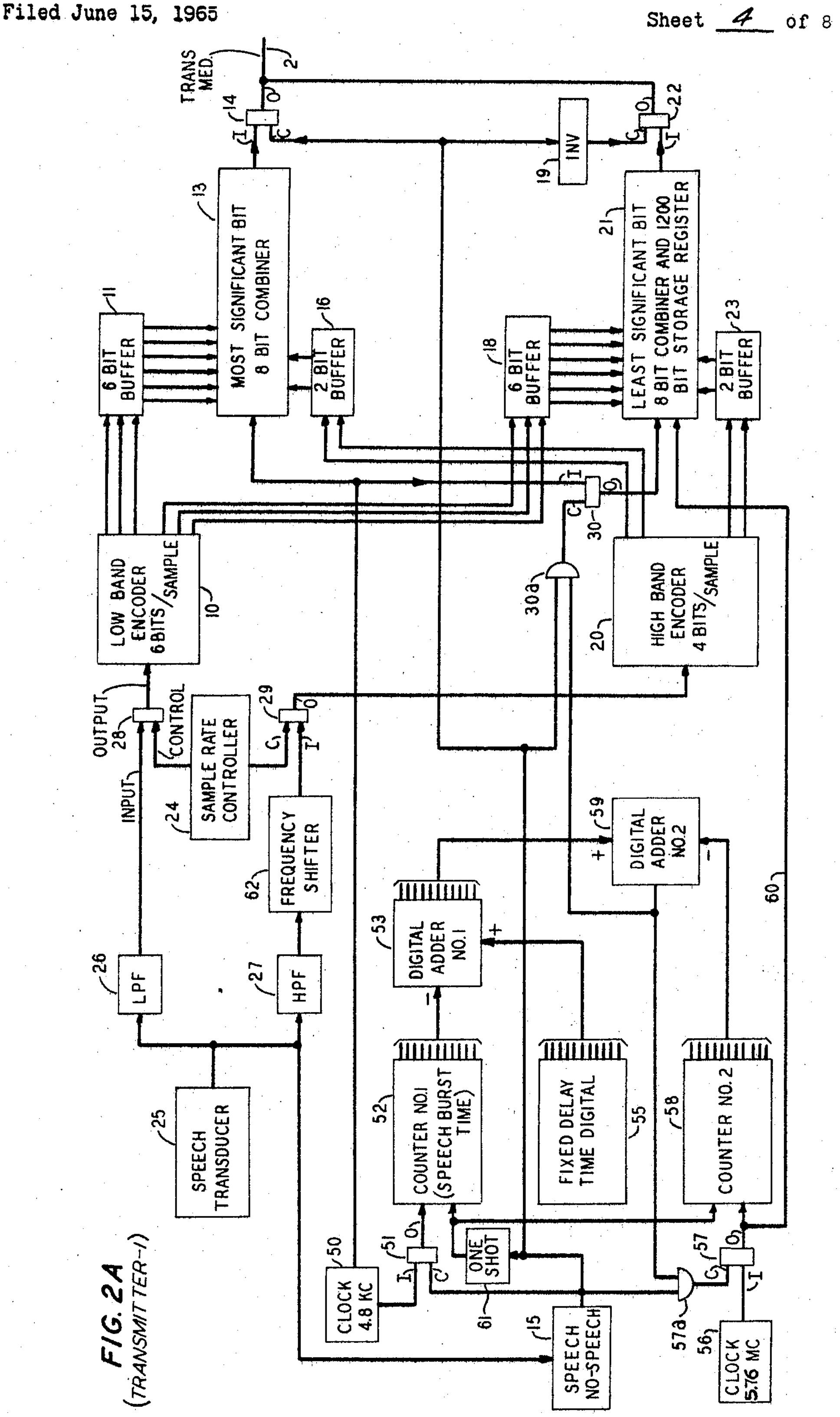
FIG. 2A (TRANSMITTER-1)

(TRANSMITTER)

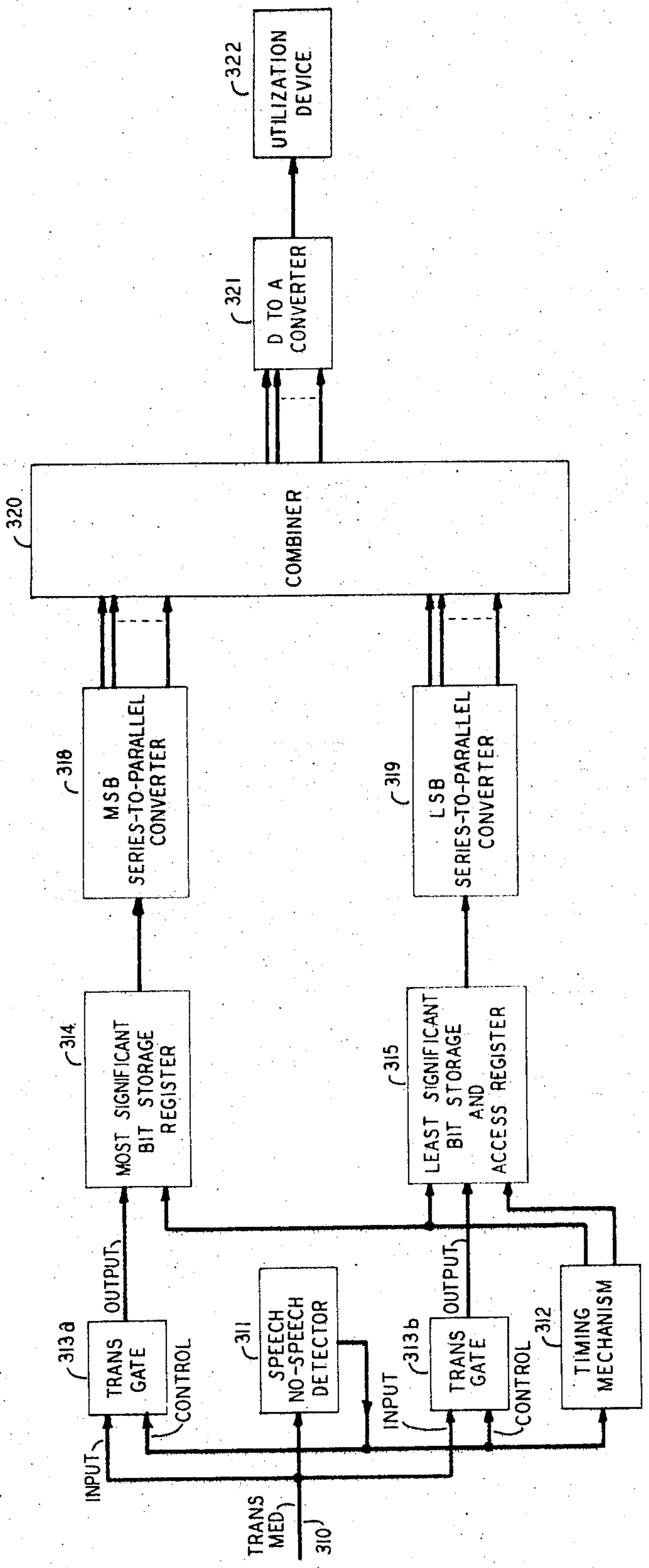
FIG. 3B (RECEIVER)

3,424,869
DIGITAL SPEECH INTERPOLATION COMMUNICATION SYSTEM

Frederick N. Anderson, Parsippany, Richard N. Kennedy, Mendham, and Robert A. Reed, Hackettstown, N.J., assignors to Bell Telephone Laboratories Incorporated, New York, N.Y., a corporation of New York Filed June 15, 1965, Ser. No. 464,178
U.S. Cl. 179—15.55 12 Claims
Int. Cl. H04b *1/66*

This invention relates to systems for reducing the frequency bandwidth required to transmit speech information, and particularly to systems in which bandwidth is reduced by interpolating speech information into the silent intervals that normally separate bursts of energy in speech sounds.

A number of prior art bandwidth reducing systems obtain bandwidth reduction by interleaving the speech sounds of active speakers into the silent intervals of other temporarily nonactive speakers. A system of this type is disclosed in A. E. Melhose Patent 2,541,932, issued Feb. 13, 1951, where each of a group of talkers is periodically sampled and, if active, is provided with a speech channel for the duration of the talker's speech burst. At the termination of one talker's speech burst, the channel used by that talker is assigned to another talker who becomes active after the first talker becomes silent. Thus when the number of talkers exceeds the number of transmission channels, significant bandwidth reduction is achieved. However, it is obvious that no reduction in bandwidth is obtained if the number of talkers at any one time is less than or equal to the number of transmission channels available because in this case each talker is assigned a separate transmission channel.

In another type of bandwidth reducing system, bandwidth is reduced for each individual conversation rather than on a group basis so that bandwidth is conserved regardless of the number of talkers at any instant. One of the the earliest methods of reducing the bandwidth required to transmit a single conversation is disclosed in J. C. Steinberg Patent 1,836,824, issued Dec. 15, 1931. The invention disclosed in the Steinberg patent was based on the recognition that speech is composed of two basic types of sounds, vowels and consonants, and that a vowel speech sound has an energy spectrum in which substantially all the energy is transmitted by low frequency components, while on the other hand, a consonant or fricative speech sound has an energy spectrum in which substantially all the energy is transmitted by high frequency components. Because high frequency consonant sounds usually do not occur simultaneously with low frequency vowel sounds, the Steinberg invention provided for the separation of the two types of sounds on a time basis and bandwidth reduction was achieved by discarding the low frequency components of consonants and the high frequency components of vowels. However, there are a number of speech sounds that have both high and low frequency components and as a result a system which reduces bandwidth on the basis of whether a sound is a vowel or a consonant is likely to produce significant degradation in the quality of speech transmitted.

Another system for reducing the bandwidth required by an individual speaker is disclosed in J. L. Flanagan Patent 3,158,693, issued Nov. 24, 1964, in which bandwidth reduction is based upon the observation that active speech bursts representing syllables in words occupy only about 56 percent of the total time occupied by the spoken words, the remainder of what appears to a listener to be continuous speech being in fact silent intervals. In the Flanagan invention, the bandwidth required to transmit an individual talker's speech is reduced by dividing each speech burst into two frequency bands, a low band and a high band, and then transmitting immediately the low frequency band while delaying the transmission of the high frequency band for the duration of the speech burst. During the silent interval following the speech burst as much as possible of the high frequency band is transmitted to the receiver. At the receiver, the low frequency band is delayed by a constant amount of time which exceeds the expected duration of most speech bursts. When the high frequency band arrives at the receiver, it is delayed by the amount of time by which the constant delay of the low band at the receiver exceeds the delay of the high band at the transmitter, this high band delay being determined by the duration of the speech burst from which the high frequency band was derived. This variable delay of the high band at the receiver is required in order to make the total delay of both bands of each speech burst a constant which is independent of the length of the corresponding energy burst and thereby ensure that there is no degradation in the subjective qualities of the transmitted speech. The variable delay of the high band also brings it into time coincidence with the low band, and the time coincident low and high frequency bands are combined to form a recombined speech sound that is then delivered to the listener.

Speech statistics show that silent intervals are shorter, on the average, than speech bursts. Therefore, Flanagan's apparatus discards the last part of the high frequency portion of each speech burst when the silent interval following each speech burst is shorter than the speech burst. Also in the relatively rare event that a speech burst exceeds the maximum variable delay provided at the transmitter for the high frequency portion of the speech burst, no transmission space is available for the first part of the high frequency band and, to avoid undue complexity in the transmitting and receiving equipment, the complete high frequency band of the speech burst is discarded.

Applicant's invention reduces bandwidth by interpolating part of the talker's conversation into his own silent intervals but avoids the above effects of speech statistics on the Flanagan invention by transmitting at all times at least the most significant part of both the high frequency band and the low frequency band regardless of the length of the silent interval following the speech burst and regardless of the length of the speech burst itself. This is accomplished in one embodiment by dividing each speech sound into a high frequency band and a low frequency band, sampling each of the two bands at selected sampling rates, and encoding each sample of each band into a binary code word. Each binary code word is divided into most and least significant digits and the most significant digits of each code word are transmitted immediately to a receiver, where upon receipt they are stored for a constant time period. The least significant digits of each code word are delayed at the transmitter until the speech burst from which they were derived terminates. Then during the silent interval following the speech burst as many as possible of these least significant digits are transmitted to the receiver where, upon arrival, they are delayed by a variable time delay prior to recombination with the most significant digits from the corresponding code words. The variable time delay is equal to the difference between the constant delay of the most significant digits and the length of each speech burst in order to ensure that the total delay of each reconstructed code word is constant, regardless of the length of the speech burst from which it is derived, and in order to synchronize at the receiver the most and least significant digits of each code word preparatory to their recombination.

This invention also encompasses arrangements wherein prior to transmission each speech burst is divided into more than one frequency band, either mutually exclusive or overlapping, and at the other extreme, an arrangement wherein each speech burst is not divided into frequency bands but is treated as a single frequency band. In all of these cases each frequency band is sampled at a sampling rate selected for that band, and each sample of each frequency band is coded into a binary code word. Each code word is then divided into most and least significant digits, and the most significant digits are transmitted directly and without delay to the receiver throughout the speech burst while the least significant digits are stored at the transmitter for possible transmission to the receiver during the silent interval following the speech burst.

In this invention, the sampling rates of the various frequency bands are not necessarily equal. Thus the total number of binary digits or bits per second which can be transmitted from the transmitter to the receiver can be allocated between the various frequency bands according to the relative importance of the bands. Taking for an example, the case where the speech burst is divided into two frequency bands, if the transmission system has a maximum continuous transmission capacity of 4800 bits per second neglecting framing bits, it is possible to transmit the low frequency band using 3240 bits per second while the high frequency band is transmitted at 1560 bits per second. Thus if desired, the low band may be sampled more than twice as often as the high frequency band. Moreover, it is possible to code samples of one band into code words possessing a different number of digits than the code words into which the samples of the other band are coded. This allows added flexibility in determining the sampling rates for the low and high frequency bands.

The highest effective data transmittal rate is obtained when data is continuously transmitted despite the intermittent nature of the speech bursts. The present system approaches this ideal in performance but is prevented in most cases from attaining this optimum transmittal rate because of the effect of speech statistics. Thus when the length of a speech burst exceeds the length of the silent interval following the speech burst, the least significant bits still to be transmitted at the end of the silent interval are discarded by the end of the next speech burst following this silent interval. This occurs even though the next following speech burst might be quite short and followed in turn by a long silent interval in which it would be possible to transmit all the remaining least significant bits from the first speech burst.

Also, when the length of the speech burst exceeds the maximum delay of the least significant bits at the transmitter, least significant bits will become available for transmission while the transmission channel to the receiver is still occupied by the most significant bits from the continuing speech burst. These least significant bits must be discarded at the transmitter to make room in the least significant bit storage register for more least significant bits from the same speech burst. At the same time that these least significant bits are being discarded, the most significant digits from the same code words as the discarded least significant bits are emerging from their constant delay storage register at the receiver. Because the least significant bits from the same code words have been discarded at the transmitter, these most significant bits must be used by themselves for the duration of the speech burst to construct a replica of the original speech wave. When the speech burst terminates, the least significant bits from the last part of the speech burst are sent to the receiver as they emerge from their storage register at the transmitter. They arrive at the receiver just as the most significant digits from the same code words emerge from their constant delay at the receiver and are immediately recombined with these most significant bits and used to derive a replica of the remainder of the speech burst which is of higher quality than the replica of the first part of the speech burst.

The invention will be fully understood from the following detailed description of illustrative embodiments thereof taken in connection with the appended drawings, in which:

FIGS. 1A and 1B are schematic block diagrams of a complete bandwidth reduction system embodying the principles of this invention;

FIG. 2A is a schematic block diagram of a transmitter utilizing the principles of this invention;

FIGS. 3A and 3B are schematic block diagrams of a bandwidth reduction system applying the principles of this invention to a single frequency band;

Figure 1C:
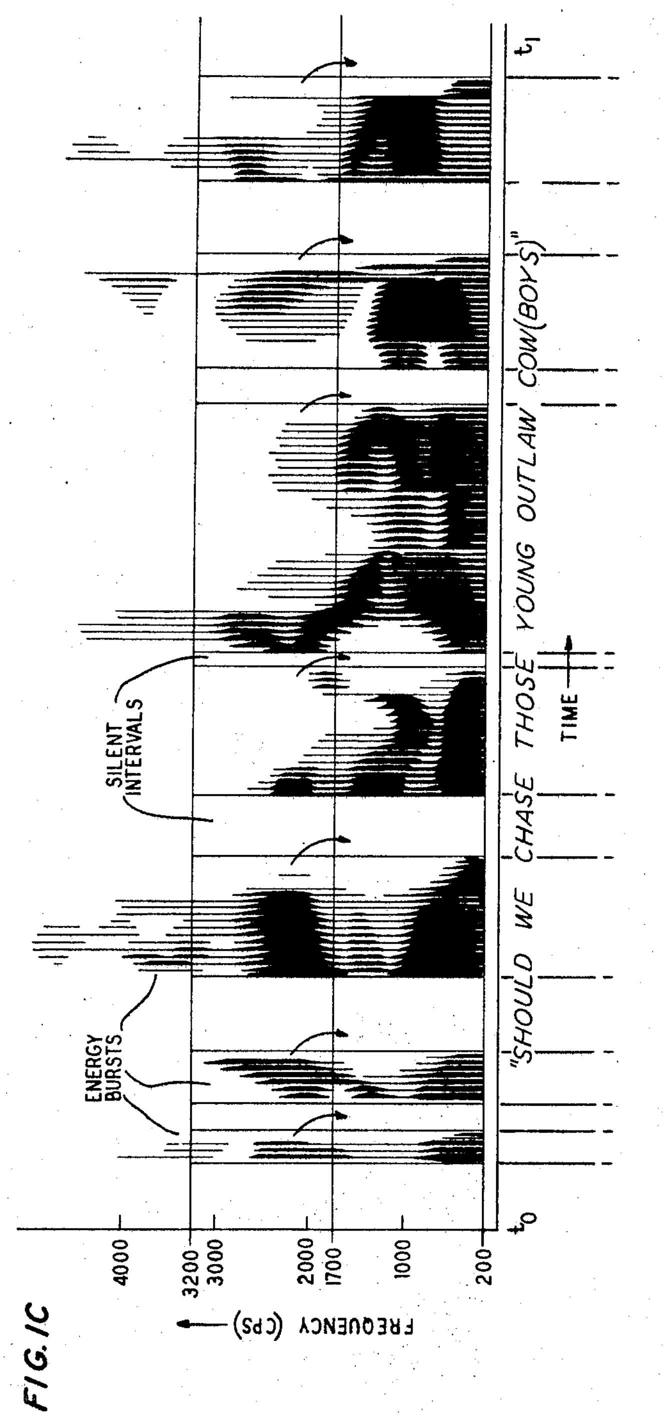
FIG. 1C is a replica of the spectrogram of connected speech sounds.
Figure 5A:
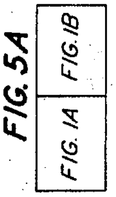
FIG. 5A shows the relationship between FIGS. 1A and 1B.
Figure 5B:
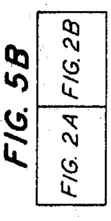
FIG. 5B shows the relationship between FIGS. 2A and 2B.
Figure 5C:
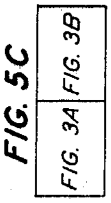
FIG. 5C shows the relationship between FIGS. 3A and 3B.

Referring first to FIG. 1C, there is illustrated a replica of a sound spectrogram of the utterance, "should we chase those young outlaw cowboys?" The shaded areas represent varying amounts of energy, with the darker areas representing greater amounts of energy than the lighter areas, and the unshaded or blank areas representing zero energy or silent intervals. It is observed that this seemingly continuous utterance is in fact composed of a succession of energy bursts separated by silent intervals. This invention takes advantage of the silent intervals to reduce the bandwidth required to transmit voice signals by transmitting during the silent interval next following a speech burst the least significant digits from a series of code words representing samples of the speech burst.

The reduction in bandwidth obtained by utilizing the silent intervals between speech bursts for the transmission of binary digits is equivalent to an increase in the effective data or bit rate of the digital transmission system. The effective bit rate, $b_{eff}$, is defined as the total number of bits transmitted, Q, during the total speech burst duration time. The maximum increase in effective bit rate obtained by utilizing the silent intervals between speech bursts for the transmission of information which would otherwise be discarded can be calculated as follows. Let $b_t$ be the maximum number of bits per second capable of being transmitted through a given transmission facility, let P be the average speech burst duration per second, and let $T_2-T_1$ be the elapsed time of a sentence. Then if it is assumed that bits are continuously being transmitted even during silent intervals in the sentence, the total number of bits, Q, transmitted during the time period $T_2-T_1$ is $$Q=b_t(T_2-T_1) \quad (1)$$

The total speech burst duration time is merely $P(T_2-T_1)$. Thus the effective bit rate is just $$b_{eff}=b_t(T_2-T_1)/P(T_2-T_1) \quad (2)$$

or $$b_{eff}=b_t/P \quad (3)$$

Equation 3 gives the maximum possible effective bit rate $b_{eff}$ as a function of both the maximum number of bits per second capable of being transmitted through a given transmission facility, $b_t$, and the average speech burst duration per second, P. In practice this maximum effective bit rate is not attained because bits are not available at all times for transmission during the silent intervals between speech bursts.

*Two frequency bands*

Turning now to FIG. 2A, there is illustrated a transmitter 1 utilizing the principles of this invention. At the transmitter 1, a speech sound is converted into an electrical signal by means of a transducer 25. The electrical signal is divided into two frequency bands, which for the purpose of this description are called a low frequency band and a high frequency band, by means of low pass and high pass filters 26 and 27, respectively. The low frequency band is then sampled at a predetermined rate, for example, 1200 times per second, by being passed through transmission gate 28 opened by pulses from the sample rate controller 24 for the time period corresponding to the sample width. The high frequency band is shifted in frequency to the same frequency range occupied by the low frequency band by frequency shifter 62 and then is sampled at a second predetermined rate, for example, 600 times per second, by being passed through transmission gate 29 controlled also by sample rate controller 24. The resulting samples of the low and high frequency bands are transmitted to the low band encoder 10 and the high band encoder 20, respectively, where each sample is quantized and converted into a binary code word.

It will be assumed for this description only that each sample of the low frequency band is encoded into a six bit code word and that each sample of the high frequency band is encoded into a four bit code word. The six digits in each code word representing one sample of the low frequency band are divided into two groups, the first group consisting of the three most significant digits and the second group consisting of the remaining three least significant digits. Likewise the four digits in each code word representing one sample of the high frequency band are divided into two groups, one group consisting of the two most significant digits and the second group consisting of the remaining two least significant digits.

The transmitter transmits immediately only the most significant digits in each code word and delays the least significant digits at the transmitter for the duration of the speech burst from which the least significant digits were derived. Therefore, the most significant digits from each sample of the low and high frequency bands must be interleaved at the transmitter in preparation for immediate serial transmission to the receiver. This is done as follows. The three most significant digits from each sample of the low frequency band are transmitted in parallel to a six bit buffer register 11. Register 11 holds the six most significant bits from two samples of the low frequency band. The reason for the use of two low band samples will be explained shortly. At approximately the same time the two most significant bits from one sample of the high frequency band are transmitted to the two bit buffer register 16. The function of buffer registers 11 and 16 is to receive the most significant bits from two samples of the low frequency band and from one sample of the high frequency band and then to release their total combined content of eight bits simultaneously into an eight bit combiner 13. The combiner 13 contains eight serially arranged memory units or shift registers. The eight bits from the buffers 11 and 16 are deposited in the shift registers in combiner 13 and are then released from the combiner 13 at a rate of 4800 pulses per second. Just after the digital pulse stored in the first shift register in the combiner 13 is released for transmission, the digital pulse stored in the second shift register is shifted one position into the first shift register preparatory to its release. Simultaneously the information in the third through eighth shift registers is shifted to the second through seventh shift registers, resulting in the simultaneous shift of all stored information by one shift register. The shift registers in the combiner 13 are driven at the digital pulse repetition frequency of 4.8 kc. by clock 50. It should be realized that the digital pulse repetition frequency is limited primarily by the bandwidth of the transmission facility and in general could be higher or lower than 4.8 kc.

The stream of digital pulses from the combiner 13 is delivered to the narrow bandwidth transmission channel 2 by way of transmission gate 14. Gate 14 is operated to pass the digital pulse stream during a speech burst but is disabled during silent intervals. Gate 14 is controlled by the speech-no-speech indicator 15 which sends out a signal to open gate 14 whenever the electrical signal generated by a speech sound exceeds a certain threshold value and which sends out a second signal to close gate 14 whenever the electrical signal falls below the threshold voltage. If desired, a short delay can be provided between the termination of a speech burst and the closing of gate 14 to allow all the most significant bits in combiner 13 to be transmitted. A corresponding delay would then also have to be provided before the opening of transmission gate 22 and the transmission of the stored least significant bits from storage register 21.

During the transmission of the most significant digits of each code word, the least significant digits from the same code words are stored at the transmitter. The two groups of three least significant digits from two consecutive code words representing two consecutive samples of the low frequency band are transmitted to buffer register 18 which, like buffer register 11, also has a capacity of six binary bits. At about the same time, the two least significant digits from one code word representing one sample of the high frequency band are placed in buffer 23. When both buffer 18 and buffer 23 are filled with digital pulses, their information is transferred to the least significant bit combiner and storage register 21. Storage register 21 contains 1200 shift register memory units. During a speech burst, the storage register 21 is driven 4800 times per second through transmission gate 30 by clock 50. Thus it takes one-quarter second for information stored in the first shift register to reach the 1200th shift register and as a result storage register 21 acts as a one-quarter second delay.

The first eight shift registers in storage register 21 are emptied of information after eight cycles of clock 50. During these eight cycles, two more samples are taken of the low frequency band and after coding by encoder 10, the six most significant bits of the two code words representing these two samples are sent to the six bit buffer 11. Also, during these eight cycles one sample is taken of the high frequency band and after coding by encoder 20, the two most significant bits from the code word representing this sample are sent to two bit buffer 16. In the same manner, the six least significant bits from the code words representing the same two samples of the low frequency band are sent to the six bit buffer 18 and the two least significant bits from the code word representing one sample of the high frequency band are sent to the two bit buffer 23.

The combining of digits from two samples of the low frequency band with digits from one sample of the high frequency band in the buffer registers 11, 16, 18, and 23 is dictated by the following considerations. In order to be able to correlate the locations of the digital pulses in the buffers 11, 16, 18, and 23 with their locations in the code words from which they were derived, it is necessary that at any time the digital pulses representing a specific sample in successive equal-sized groups of samples occupy the same relative positions in the buffers 11, 16, 18, and 23. For this to be so these buffers must hold all the bits generated in the shortest period during which an intgeral number of samples are taken of both the low and high frequency bands. For example, if the low band is sampled at 560 samples per second and if the high band is sampled at 240 samples per second, the shortest period during which both the low band and the high band are sampled an integral number of times is one-eightieth (1/80) of a second, during which time the low band is sampled seven times and the high band is sampled three times. In the embodiment shown in FIG. 2A, the low band is sampled 1200 times per second and the high band is sampled 600 times per second. Thus the shortest time interval during which both bands are sampled an integral number of times is one six-hundredth (1/600) of a second during which time the low band is sampled twice and the high band is sampled once. Thus buffers 11 and 18 are designed to hold all the binary digits generated from two samples of the low band while buffers 16 and 23 are designed to hold all the binary digits generated from one sample of the high band.

The digital pulses stored in buffers 18 and 23 are periodically transferred to storage register 21. As mentioned earlier, storage register 21 is driven by clock 50 through transmission gate 30 during speech bursts so that the information stored in any one memory unit in the register is shifted to the next memory unit once every 0.2085 millisecond and it takes one-quarter second for information stored in the first memory unit to reach the 1200th or last memory unit. In the unlikely event a speech burst lasts more than one-quarter second, all of the least significant information which reaches the 1200th memory unit while the burst continues is lost because it must be discarded in the next shift cycle to make room for new information from the same speech burst entering the first storage register. Ordinarily, however, a speech burst lasts less than one-quarter second and the first digital pulse from the speech burst will be stored somewhere in the interior of storage register 21 upon the termination of the speech burst. At this time speech-no-speech indicator 15 emits a signal which closes gate 14 and by passing through inverter 19, opens gate 22. Since the speech burst has lasted less than the transit time of the least significant pulses through storage register 21, there is no pulse available in the 1200th memory unit of register 21 for transmission through gate 22 to the receiver. In this situation, the information stored in register 21 is advanced very rapidly to the 1200th memory unit preparatory to transmission in the following manner.

The output pulses of the clock 50 are passed through transmission gate 51 during speech bursts to a first digital counter 52 which measures the duration of speech bursts in terms of clock pulses. The digital output from the first digital counter 52 is subtracted in a digital adder 53 from the digital representation of the number of memory units in register 21 which is supplied for example by a counter 55 adjusted to have a predetermined constant count condition. Hence the difference represented by the count condition of the digital adder 53 indicates the number of memory units by which the information in storage register 21 must be advanced in order to have information available for readout and transmission from register 21 upon the termination of a speech burst.

Whenever a speech burst is shorter than 0.25 second, digital adder 59 provides a signal to close transmission gate 30 on the termination of the speech burst and to open transmission gate 57 thereby allowing the output signal from the 5.76 mc. clock 56 to pass directly to storage register 21 through lead 60. When this happens storage register 21 is driven at 1200 times its normal speed resulting in the very rapid advance of the stored information through the register in preparation for the readout of this information. Gate 30 is closed by an output signal from AND gate 30*a*. AND gate 30*a* emits an output signal in response to both a no-speech indication from indicator 15 and a positive signal from digital adder 59. Immediately following the termination of a speech burst shorter than 0.25 second, the output signal from digital adder 59 is positive, and indicator 15 sends out a no-speech signal. Therefore gate 30 closes following the termination of a speech burst. At the same time, the state of digital adder 59 and the control signal from speech no-speech indicator 15 are also sent to AND gate 57*a*, which, in response to these two signals, emits an output signal which opens transmission gate 57. Transmission gate 57, when open, allows the output pulses from clock 56 to be transmitted over lead 60 to combiner and storage register 21. As long as transmission gate 57 remains open, storage register 21 is driven at 1200 times its normal speed.

The high frequency signal from clock 56 is also passed through gate 57 to a second digital counter 58 which counts the number of cycles of the high frequency signal from clock 56 which pass through gate 57 to register 21. The count condition of digital counter 58 is subtracted in digital adder 59 from the count condition of digital adder 53. When the count condition of digital counter 58 equals or exceeds the count condition of digital adder 53, gate 57 is closed and the rapid advancement of information in storage register 21 ceases. The output signal from adder 59 is also transmitted to AND gate 30*a* in order to open gate 30 when the count condition in adder 59 is equal to or less than zero. Thus storage register 21 is again driven at 4.8 kc. and the digital pulses or bits stored in this register are transmitted to the receiver 3 through gate 22, at a rate of 4800 bits per second. It should be noted that the states of gates 30 and 57 are complementary. When gate 30 is open, gate 57 is closed and vice versa.

Digital counters 52 and 58 are cleared at the start of each speech burst by a pulse from one-shot multivibrator 61 which is controlled by a signal from indicator 15. If a speech burst lasts longer than the delay time provided by storage register 21, digital counter 52 will stop counting after 1200 cycles of 4.8 kc. clock 50 and will hold the count constant at 1200, until cleared by the start of the next speech burst. Counter 58 must also be cleared before the termination of the next speech burst and this is done most conveniently by making use of the same pulse from one-shot multivibrator 61 which is used to clear counter 52.

Figure 2B:
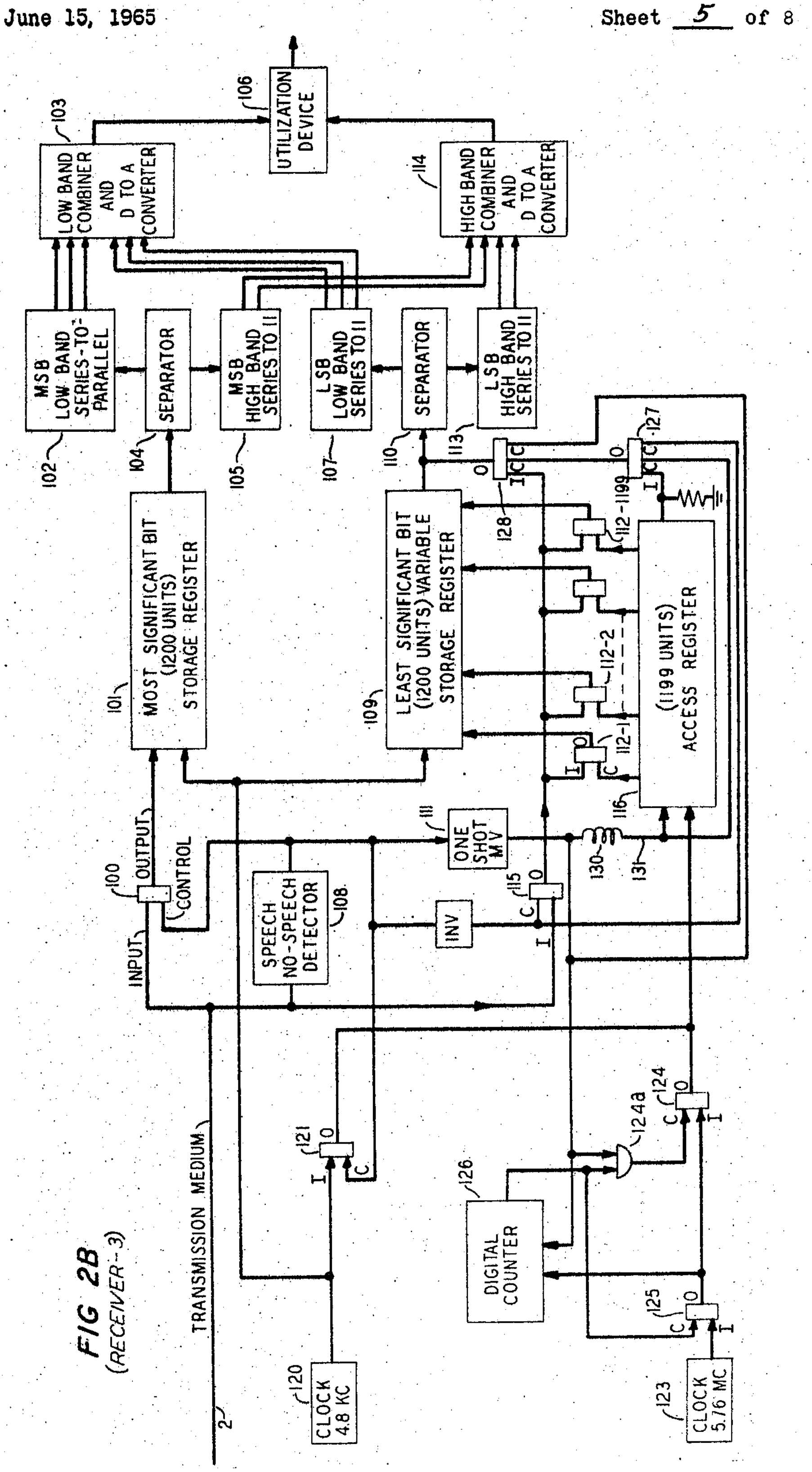
FIG. 2B is a schematic block diagram of a receiver utilizing the principles of this invention.

Turning now to FIG. 2B, there is illustrated a receiver 3 complementary to the transmitter 1 shown in FIG. 2A. At the receiver 3 the digital pulse stream must pass through either transmission gate 100 or transmission gate 115 depending on whether the pulse stream represents most or least significant digits respectively. During a speech burst the transmitted digital pulses represent most significant bits only. The speech no-speech detector 108 detects the presence of pulses representing speech through the use of framing bits and opens gate 100 in response to a speech burst while closing gate 115. The digital pulses which pass through gate 100 during a speech burst are stored in the most significant bit storage register 101. Register 101 contains 1200 digital memory units and is driven at 4.8 kc. by clock 120. The information stored in the first memory unit of storage register 101 is shifted to the second memory unit within one clock pulse period or 0.2085 millisecond after being placed in the first memory unit. This process continues for 250 milliseconds or 1200 clock pulses until the first digital pulse to reach the storage register 101 is placed in the last or 1200th memory unit. At the 1201st clock pulse from clock 120, the information stored in the last memory unit of storage register 101 will be transferred to a separator 104.

A separator consists basically of two parallel shift registers, both driven at the digital pulse repetition rate of 4800 c.p.s. The first shift register is loaded sequentially with bits and, when full, the bits in each memory unit are shifted simultaneously in parallel to corresponding locations in a second shift register. The first shift register then proceeds to fill with bits again. The second shift register contains as many output leads located sequentially along the register as there are frequency channels represented by the bits in the register. The bits in the second register are driven sequentially from the second register onto the particular output lead which connects the second register with the frequency band from which those bits were derived. Devices of this type are well known in the digital art.

Separator 104 separates the most significant bits representing samples of the low frequency band from the most significant bits representing samples of the high frequency band. The most significant bits representing the low frequency band are sent to series-to-parallel converter 102 and from there to the low band combiner and digital-to-analog converter 103 where they are recombined with the available least significant bits representing the low frequency band of the same speech burst. The most significant bits representing the high frequency band are sent to series-to-parallel converter 105 and from there to high band combiner and digital-to-analog converter 114 where they are recombined with the least significant bits representing the high frequency band of the same speech burst.

The least significant bits representing samples from both the low frequency band and the high frequency band are transmitted from the transmitter shown in FIG. 2A to the receiver shown in FIG. 2B only during the silent intervals between speech bursts. At the receiver 3, speech no-speech detector 108 detects the absence of speech and opens gate 115 while closing gate 100. The binary pulses representing the least significant digits are stored in variable storage register 109 which contains 1200 memory units. Variable storage register 109 is driven by clock 120 at 4.8 kc. in the same manner as is storage register 101. However, access to storage register 109 is obtained through one of a series of transmisison gates 112–1 through 112–1199 which in turn are controlled by the location of a single pulse in an access register 116.

At the beginning of a speech burst, speech no speech detector 108 causes the one-shot pulse generator 111 to generate a pulse. This pulse is delayed, for a reason to be discussed later, in delay 130 by the time period necessary to generate one digital pulse or by 0.2085 millisecond and then is transmitted through lead 131 to the first memory unit in access register 116. No further pulses are emitted from one-shot pulse generator 111 until the beginning of the next speech burst.

Access register 116 is driven by the 4.8 kc. output signal of clock 120 through gate 121 which is closed during no-speech periods by a signal from detector 108 and which is open during speech periods. Thus the timing pulse from the one-shot multivibrator 111 is driven through access register 116 at a 4.8 kc. rate for the duration of the speech burst. When the speech burst terminates, gate 121 closes, access register 116 is no longer driven at 4800 cycles per second, and thus the pulse remains stationary in access register 116.

Transmission gates 112–1 through 112–1199 connect transmission line 2 through transmission gate 115 to variable storage register 109. The particular gate **112–*n***, where *n* is a positive integer equal to or greater than one and less than or equal to 1199, which is open depends on the location in access register 116 of the timing pulse generated by one-shot multivibrator 111. Each memory unit in access register 116 is connected to the control terminal of one of the transmission gates **112–*n*. Thus as the pulse travels through register 116, it enables in sequence the gates 112–1, 112–2 . . . 112–*n*, which are attached to the memory units 116–1, 116–2 . . . 116–*n* in which the pulse is progressively stored The termination of the speech burst cuts off clock 120 from register 116 by closing gate 121 and causes the pulse to remain in the memory unit in which it was located at the termination of the speech burst. Thus the gate 112–*n*** attached to the *n*th memory unit in which the pulse is stored remains open for the duration of the silent interval following the speech burst which originally generated the pulse. The least significant digits of each code word pass through gate 115 which has been opened by detector 108 and then through the particular transmission gate **112–*n* which is open into variable storage register 109. Register 109 is continuously driven by clock 120 with the result that the least significant digits stored in that register are constantly shifted at the rate of 4800 pulses per second toward the output terminal of the register. Therefore the time required for a least significant digital pulse to travel through register 109 is just the difference between the constant delay of the most significant digits in register 101 and the duration of the speech burst from which the pulse was derived. At the termination of the silent interval following the speech burst, register 109** will continue to emit the least significant digits stored therein at the rate of 4800 per second.

All the least significant digits are separated, according to the band from which they were derived, by separator 110, passed through series-to-parallel converters 107 and 113, and then transmitted to the low frequency band high frequency band combiners and digital-to-analog converters 103 and 114 respectively where they are combined with the most significant bits from the same code word. The output signals from converters 103 and 114 are then transmitted to terminal network 106 where they are combined for transmission to, for example, an electrical-mechanical transducer such as a loudspeaker.

The purpose of the one-bit delay 130 between one-shot multivibrator 111 and access register 116 is to prevent the new timing pulse generated by one-shot multivibrator 111 at the start of each speech burst from entering register 116 until the old timing pulse has been removed. At the start of each new speech burst the timing pulse generated by one-shot multivibrator 111 not only travels through the one-bit delay 130 to register 116 but also is used to enable transmission gate 124. This is done as follows. The pulse from one-shot multivibrator 111 is sent to one input terminal of AND gate **124*a* and simultaneously is sent to activate digital counter 126 which nominally possesses a zero count and therefore a zero output signal. The pulse from one-shot multivibrator 111 changes the count in counter 126 from zero to one, thereby causing counter 126 to generate an output signal which is sent to the second terminal of AND gate 124*a*. Upon receiving signals on both input leads, AND gate 124*a* produces an output signal which opens transmission gate 124. AND gate 124*a* generates a continuous output signal until the output of counter 126 goes to zero. The output signal from digital counter 126 is also used to open transmission gate 125. Gates 124 and 125 are normally closed during both the speech and no-speech periods but upon the receipt of the pulse from one-shot multivibrator 111 at the beginning of a new speech burst they are opened thereby creating a conducting path between 5.76 mc. clock 123 and access register 116. The output signal from clock 123 drives the access register 116 very rapidly thus removing the previous timing pulse generated by one-shot multivibrator 111 from the register 116 before the next timing pulse generated by one-shot multivibrator 111 upon the start of the next following speech burst reaches access register 116**.

The high frequency signal from the 5.76 mc. clock 123 also drives digital counter 126 which is designed to count to 1200 before returning to zero. When the first pulse from clock 123 reaches counter 126, the counter has a count of one (1) representing the pulse generated by the one-shot multivibrator 111. After 1200 cycles of clock 123, the count in digital counter 126 has returned to zero and gates 124 and 125 are both disabled, thereby blocking transmission of the high frequency signal from clock 123 to either counter 126 or access register 116. The clock 123 will remain isolated from the rest of the circuit until the start of a new speech burst causes the generation of another timing pulse by one-shot multivibrator 111.

If a speech burst lasts longer than the constant delay of the most significant bit storage register 101, the pulse in access register 116 generated by one-shot multivibrator 111 will be driven through and out of access register 116 thereby enabling none of the transmission gates 112. When the speech burst terminates after this constant delay of one-quarter second, the least significant digits transmitted must be combined immediately with the most significant digits leaving the most significant bit storage register 101 because the least significant bits from the first part of the speech burst have been discarded at the transmitter. To accomplish this, transmission gates 127 and 128 are provided. Transmission gate 127 is opened by the delayed timing pulse from one-shot multivibrator 111, the same pulse which is also driven through access register 116. Gate 127 is closed by a signal at the end of the speech burst from speech no-speech detector 108. If during the speech burst the timing pulse in access register 116 is driven out of the register, it travels through transmission gate 127 and opens transmission gate 128. Transmission gate 128 provides a direct conduction path for the least significant digits from transmission line 2 to least significant bit separator 110 when the speech burst exceeds one-quarter second. Transmission gate 128 is closed by the undelayed pulse from one-shot multivibrator 111 at the beginning of the speech burst next following the silent interval during which it was open. Thus gate 128 is closed continuously except when the duration of a speech burst exceeds the constant delay time of storage register 101 in which case gate 128 is open only for the following silent interval.

It should be noticed that the maximum delay possible in the least significant bit combiner and storage register 21 at the transmitter is equal to the constant delay of the most significant bits in storage register 21 at the receiver As mentioned earlier, if the speech burst duration exceeds the maximum delay of the register 21 at the transmitter, the least significant digits which have been stored for this maximum time in register 21 are discarded. Under these conditions the most significant bits from the same code words as these discarded least significant bits emerge from register 101 at the receiver simultaneously with the discarding of these least significant bits at the transmitter. In this situation these most significant bits by themselves form an approximate replica of the original speech burst. When the speech burst ends, the least significant bits from a given code word arrive at the receiver just as the most significant bits from the same code word emerge from storage register 101. Thus there is no need to delay the least significant bits in variable storage register 109 and the least significant bits can be passed directly to separator 110 preparatory to being recombined with the correct most significant bits. The least significant bits in these circumstances are said to have been "stored for zero time."

It is of course to be understood that while the embodiment described above shows the electrical signal being divided into two nonoverlapping frequency bands, the invention works equally well if the electrical signal is either divided into a multiplicity of frequency bands or, on the other hand, is treated as a single frequency band. Further, when the signal is divided into a plurality of frequency bands they can in general overlap each other. In addition, the number of digits in a code word representing one sample from a particular frequency band can differ from the number of digits in the code word representing one sample from any other frequency band. Thus great flexibility is available in determining the bit rates at which the various frequency bands are to be transmitted. Moreover, the way in which the code words representing any one frequency band are divided into most and least significant digits can also differ from frequency band to frequency band. In the limiting case, all the digits in each code word representing one sample of one frequency band can be classified as most significant digits, while all the digits in each code word representing one sample of another frequency band can be classified as least significant digits.

*Plurality of frequency bands*

Turning now to FIGS. 1A and 1B, there is illustrated another complete system for reducing the bandwidth required to transmit speech signals in accordance with the principles of this invention. The system comprises a transmitter shown in FIG. 1A, connected by a transmission medium 410 to a receiver shown in FIG. 1B. At the transmitter a typical complex speech wave characterized by the presence of silent intervals between speech bursts is converted to a transducer 400 into an electrical signal. This signal is passed through a plurality of bandpass filters 401–1 through **401–*n*, and thereby divided into a plurality of frequency bands. Each frequency band is first frequency shifted to a common selected frequency band and then sampled at a pre-selected sampling rate by passing the electrical energy in each frequency band through the combined frequency shifter and sampler 405–1 through 405–*n*. The samples of each frequency band are encoded into $i$-digit binary code words, where $i$ is a positive integer equal to or greater than one, by the appropriate frequency band encoder 406–1 through 406–*n*. Each binary code word is divided into most and least significant digits and the most significant digits from each frequency band are sent to the appropriate most significant bit buffers 407–1 through 407–*n*. The least significant digits from each code word are sent to the appropriate least significant bit buffers 408–1 through 408–*n*. The most significant bits from each frequency channel stored in the most significant bit buffers 407–1 through 407–*n* are deposited periodically in the most significant bit combiner 407. Likewise, the least significant bits from each frequency channel stored in the least significant bit buffers 408–1 through 408–*n* are deposited periodically in the least significant bit combiner and storage register 408. Combiners 407 and 408 consist of a series of binary memory units and are designed to periodically and repeatedly release the digital information stored in the last memory unit at a signal from the timing mechanism 402. Simultaneously with the release of the information stored in the last memory unit in the combiners 407 and 408**, the information stored in the other memory units in these two combiners is shifted by one memory unit in partial preparation for its eventual readout from the combiners.

During speech bursts, the digital pulses stored in the most significant bit combiner 407 are sent directly and without delay through transmission gate **409*a* to the receiver by means of transmission medium 410. The frequency at which the digital pulses are released from combiner 407 is controlled by the timing mechanism 402. Transmission gate 409*a* is controlled by indicator 403 and is opened to pass information during speech bursts but is closed or disabled by indicator 403** during silent intervals between speech bursts.

During silent intervals, transmission gate **409*b* is opened by indicator 403, thereby allowing the transmittal of the digital pulses stored in the least significant bit combiner and storage register 408. If the speech burst duration is less than the delay time of combiner and storage register 408, timing mechanism 402 is actuated to place rapidly the information in register 408 in position for immediate readout in the manner described earlier in the description of the operation of the transmitter shown in FIG. 2A. The digital pulses stored in combiner 408 are transmitted to the receiver through transmission gate 409*b* at the same frequency as are the most significant digits from combiner 407** during a speech burst.

At the receiver, shown in FIG. 1B, speech no-speech detector 421 determines whether the signal being transmitted is composed of most significant digits or least significant digits, and opens transmission gate **420*a* when the signal is composed of most significant digits and transmission gate 420*b* when the signal is composed of least significant digits. The most significant bits are stored in most significant bit storage register 423 for a constant time period chosen to be in excess of the longest expected speech burst duration. Storage register 423 is driven at the same frequency as are combiners 407 and 408 by a signal from timing mechanism 422. The least significant bits are stored in the least significant bit storage and access register 424 for a time period equal to the constant time delay of storage register 423 less the speech burst duration. Thus most and least significant bits from the same code words emerge simultaneously from registers 423 and 424 respectively. The most significant bits from storage register 423 are sent to separator 427 where they are separated according to the frequency band from which they were derived, following which these bits are sent to series-to-parallel converters 427–1 through 427–*n*. The least significant bits emerging from register 424 are sent to separator 428 where they too are separated according to the frequency band and then sent to series-to-parallel converters 428–1 through 428–*n*. The most and least significant digits from each frequency band are then recombined and converted into analog form as indicated by the blocks denoted "combiner and digital-to-analog converter" 429–1 through 429–*n*. The recombined analog signals which emerge from the digital-to-analog converters 429–1 through 429–*n* are utilized in the terminal network 430** to obtain a replica of the original speech sound.

*Single frequency band*

Figure 3A:
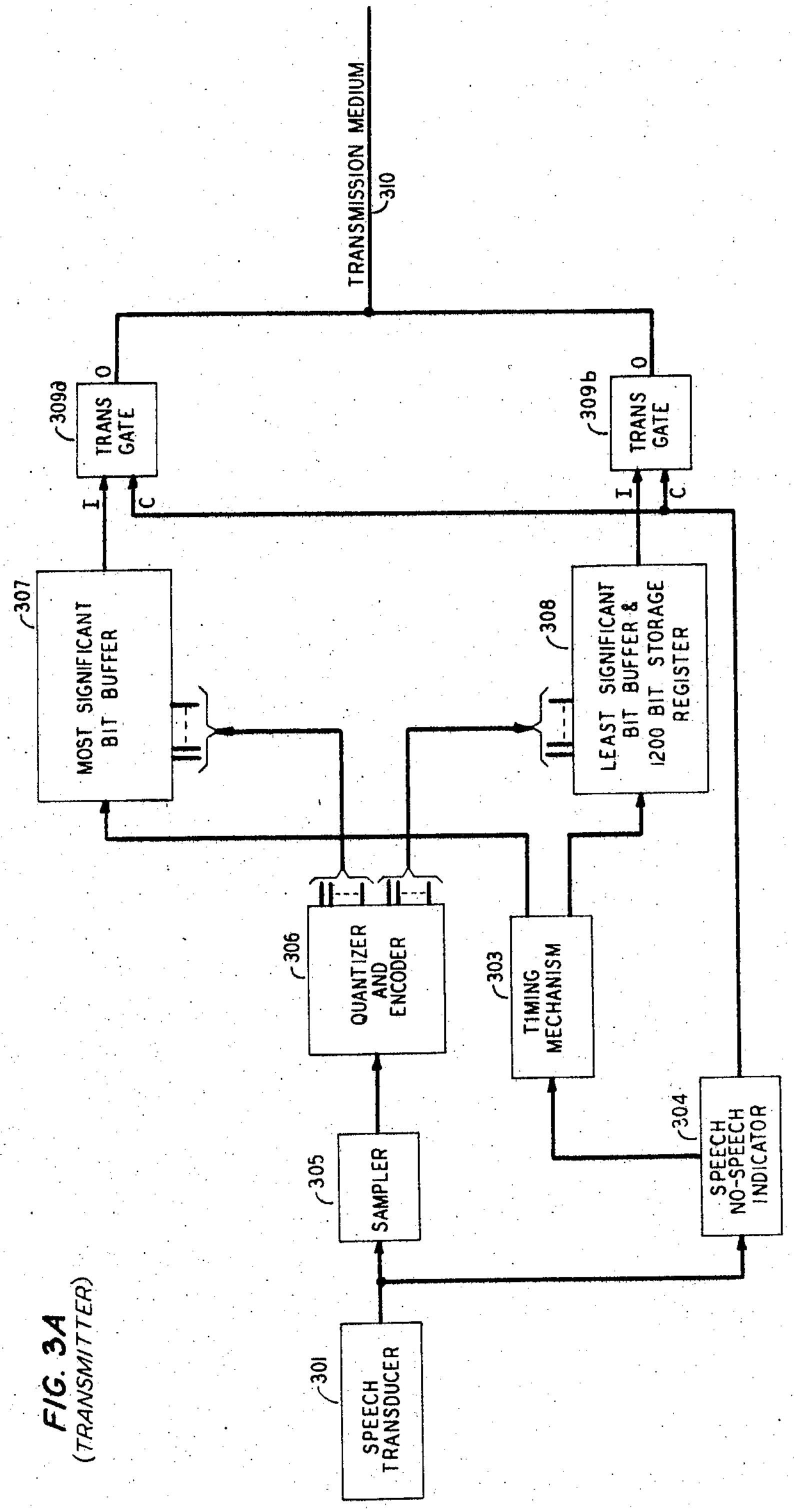

FIGS. 3A and 3B illustrate another application of the principles of this invention. At the transmitter, shown in FIG. 3A, a speech sound characterized by silent intervals between speech bursts is converted into an electrical signal by speech transducer 301. This electrical signal is sampled by sampler 305 and each sample is quantized and encoded into an $i$-digit binary code word by quantizer-encoder 306, where $i$ is a positive integer equal to or greater than two. The most significant digits of each code word are sent to the most significant bit buffer register 307 from which they are sent directly and without delay through transmission gate **309*a* to the receiver by means of transmission medium 310. The least significant bits are sent from encoder 306 to the least significant bit buffer and storage register 308. Storage register 308 is designed to delay the availability of the least significant bits for transmission to the receiver for at least the maximum expected speech burst duration. Upon the termination of a speech burst, the binary bits stored in register 308 are made available for transmission to the receiver by a control signal from timing mechanism 303, and transmission gate 309*b* is opened and transmission gate 309*a* is closed by a signal from speech no-speech indicator 304. The least significant bits stored in register 308** are then sent directly to the receiver at the same rate used to transmit the most significant digits.

At the receiver, shown in FIG. 3B, speech no-speech detector 311 detects the presence of speech and during speech bursts opens transmission gate **313*a* while closing transmission gate 313*b* thereby allowing the most significant bits to pass into most significant bit storage register 314. Storage register 314** delays the most significant digits for a constant time period in excess of the maximum expected speech burst duration.

During silent intervals, speech detector 311 closes transmission gate **313*a* and opens transmission gate 313*b* thereby allowing the least significant bits to pass directly into the least significant bit storage and access register 315. Storage and access register 315 is designed to delay the least significant bits by the constant delay imparted to the most significant bits by storage register 314 less the speech burst duration. Thus the most and least significant bits from the same code word will emerge simultaneously from registers 314 and 315. The most significant bits from register 314 are sent directly to the most significant bit series-to-parallel converter 318 and from there to combiner 320. The least significant bits from register 315 are sent directly to least significant bit series-to-parallel converter and from there to combiner 320. The recombined code words are then sent to the digital-to-analog converter 321 where they are converted to a replica of the original electrical signal. This replica signal is then sent to a suitable utilization device 322** which might for example, be a loudspeaker.

*Modified voice excited vocoder*

Figure 4:
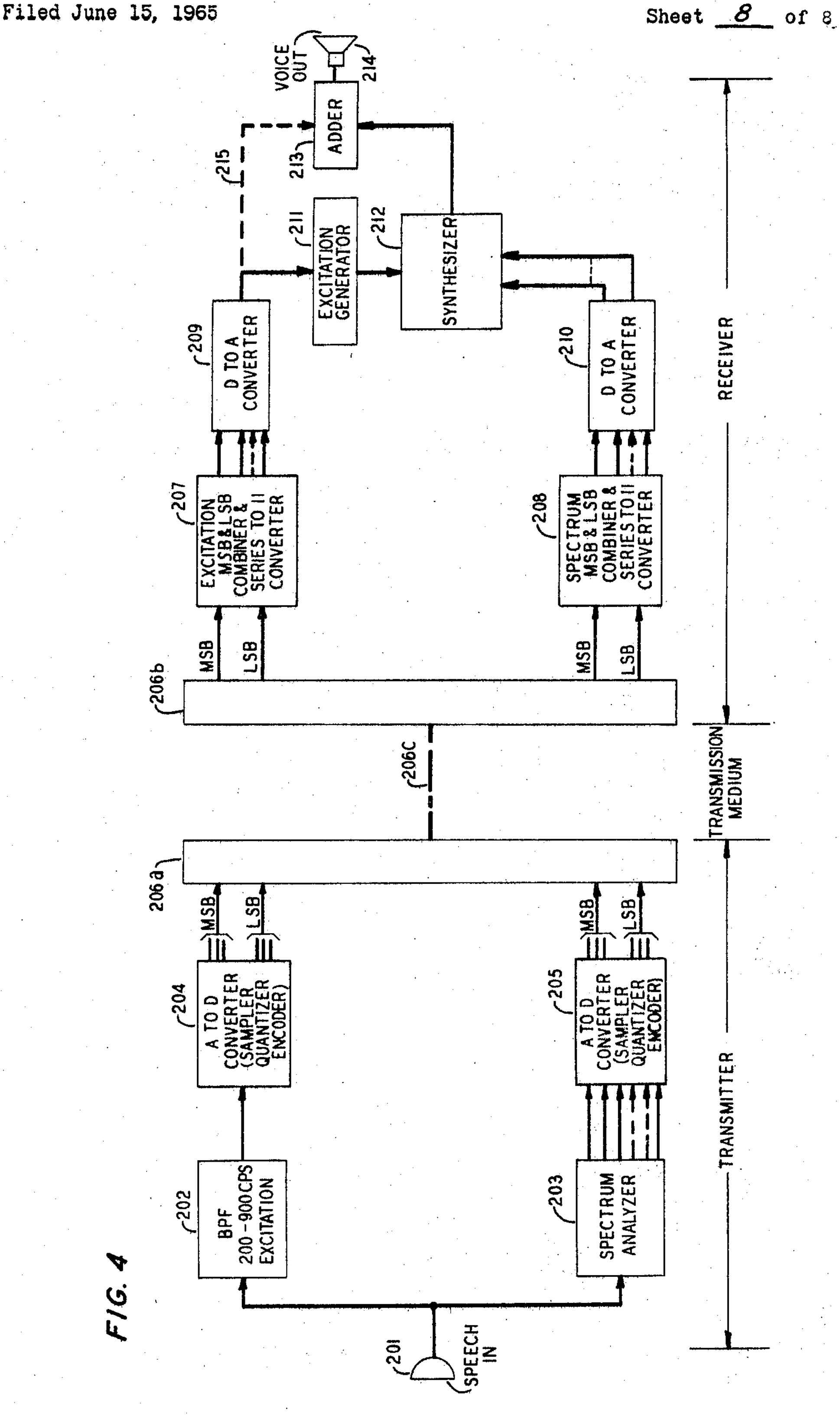
FIG. 4 is a schematic block diagram of an embodiment illustrating the application of the principles of this invention to a voice excited vocoder.

FIG. 4 illustrates the application of the principles of this invention to a modified voice excited vocoder. The modified voice excited vocoder is a system for compressing the bandwidth required for the transmission of speech and an example of a similar arrangement may be found in B. F. Logan et al. Patent 3,139,487, issued June 30, 1964. As shown in FIG. 4, a voice excited vocoder divides a speech wave into two frequency bands, the so-called excitation and spectrum frequency bands. The excitation band consists of a selected band of low frequency components for example, the components between 200 and 900 cycles per second, and is obtained by passing the electrical signal generated from the acoustical speech wave in transducer 201 through bandpass filter 202. The output signal from filter 202 is sent directly to the analog-to-digital converter 204 where it is converted into a stream of digital pulses. These digital pulses or bits are of two types, most significant bits and least significant bits. The bits generated in the analog-to-digital converter 204 are then sent to a multiplexer **206*a* which consists of the apparatus shown in FIG. 2A for transmitting the most significant bits during speech bursts and the least significant bits during silent intervals. Simultaneously with the removal of the narrow excitation band frequencies from the speech signal, spectrum analyzer 203 operates on the same speech wave to generate so-called spectrum control signals. For example, the spectrum analyzer 203 may include $n$ parallel contiguous bandpass filters designed to pass selected frequency bands. The output signal from each bandpass filter is passed through an energy detector and thereby converted into a slowly varying low frequency control signal, the magnitude of which is indicative of the energy in the frequency band passed by each filter. The $n$ low frequency control signals developed by analyzer 203 are converted into binary code words in the analog-to-digital converter 205. The stream of binary pulses or bits from converter 205 is divided into most significant bits and least significant bits by multiplexer 206*a* in the same manner as the stream of digital pulses from converter 204**.

The operation of multiplexer **206*a* has been described earlier in connection with the detailed description of FIG. 2A illustrating the transmitter of this invention. Basically, multiplexer 206*a* interleaves the most significant bits from converters 204 and 205 for transmission during speech bursts, and the interleaved bits are transmitted by way of transmission medium 206*c* to demultiplexer 206*b* at the receiver. Demultiplexer 206*b* contains the apparatus required at the receiver to separate the most and least significant bits according to whether the bits are from the excitation or spectrum frequency bands. Further, demultiplexer 206*b* contains the apparatus at the receiver necessary to ensure that each speech burst undergoes a constant delay independent of the speech burst duration. The operation of demultiplexer 206*b* has been described in detail earlier in connection with the description of the operation of the receiver shown in FIG. 2B. Thus combiners 207 and 208 combine the most and least significant digits from the excitation and spectrum frequency bands respectively. The digital output signals from combiners 207 and 208 are then sent to digital-to-analog converters 209 and 210 respectively. The output signal from converter 209 consists of a replica of the excitation frequency band and is sent directly to excitation generator 211 where an excitation signal is derived from the excitation band. Converter 210 produces $n$ output signals which are replicas of the $n$ low frequency control signals generated by spectrum analyzer 203. These $n$ output signals are transmitted to synthesizer 212 which also receives the output signal from excitation generator 211**. The output signal from generator 211 is modulated in synthesizer 212 by the spectrum control signals to reconstruct a replica of the original electrical speech wave which may be converted by transducer 214 to an audible speech signal.

In an alternative arrangement the excitation signal from digital-to-analog converter 209 may be sent directly to the adder 213 by means of lead 215, in addition to being sent to the excitation generator 211. This arrangement is known as a voice excited vocoder.

The above-described arrangements are merely illustrative of application of the principles of this invention. It is to be understood that many other embodiments incorporating these principles will be apparent on the basis of the above description to those skilled in the art without departing from the spirit and scope of the disclosed invention. In particular, the principles of this invention can be applied to a large number of bandwidth compression systems including but not limited to autocorrelation vocoders and voice excited vocoders as well as the modified voice excited vocoder.

What is claimed is:

1. Apparatus in which a complex speech wave containing silent intervals between speech bursts is divided into a plurality of frequency bands, each band being sampled at a corresponding selected rate, each sample of each band being encoded into a binary code word, and each binary code word being divided into most and least significant digits, which comprises:

means for transmitting immediately to a receiver said most significant digits of each of said binary code words obtained from each of said frequency bands during each speech burst, means for storing for the duration of each speech burst said least significant digits of each of said code words, and means for transmitting to said receiver said stored least significant digits of each of said code words during the silent interval next following each speech burst.

2. Apparatus for transmitting a speech wave containing silent intervals between speech bursts, which comprises:

means for dividing each speech burst into a plurality of selected frequency bands, means for sampling said selected frequency bands at selected sampling rates to obtain a plurality of samples of each frequency band, means for encoding said samples into binary code words, means for dividing the digits in said binary code words into groups of most significant and least significant digits, means for transmitting during a speech burst only the most significant digits in said code words from that speech burst, means for storing said least significant digits for the duration of the speech burst from which said digits were derived, means for discarding selected least significant digits in the event said speech burst duration exceeds a predetermined maximum time period during which said least significant digits can be stored, and means for transmitting during a silent interval the least significant digits from the speech burst preceding the silent interval.

3. Apparatus as claimed in claim 2 in combination with a receiver, which comprises:

means for storing said most significant digits from a speech burst for a first selected constant time period, means for storing said least significant digits from said speech burst for a second selected time period, said second selected time period being equal to the difference between said first selected constant time period and the duration of said speech burst in the event that said speech burst duration is less than said first selected constant time period, and said second selected time period being equal to zero in the event that said speech burst duration is equal to or greater than said first selected constant time period, means for recombining said stored most significant digits with said stored least significant digits to reconstruct code words representative of the samples of said plurality of selected frequency bands derived at said transmitter, means for synthesizing said plurality of selected frequency bands from said reconstructed code words, and means for reconstructing a replica of the original speech wave from said plurality of synthesized frequency bands.

4. Apparatus for reconstructing a replica of a speech wave encoded into digital code words and characterized by silent intervals between speech bursts which comprises:

a source of a series of digital signals representing the most significant digits of said digital code words during each speech burst and representing the least significant digits of said digital code words during the silent intervals next following each speech burst, means for storing each of said most significant digits for a first selected constant time period chosen to be in excess of the maximum expected speech burst duration, means for storing each of said least significant digits for a second selected time period, said second selected time period being equal to the difference between said first selected constant time period and the speech burst duration in the event that said speech burst duration is less than said first selected constant time period, and being equal to zero in the event that said speech burst duration is equal to or greater than said first selected constant time period, means for recombining said stored most significant digits with said stored least significant digits to form a replica of each of said digital code words, and means for reconstructing an artificial speech wave from said replica digital code words.

5. Speech transmission apparatus which comprises:

a transmitter including a source of a speech wave characterized by energy bursts separated by silent intervals, means for separating each energy burst of said speech wave into a plurality of frequency bands, means for sampling said plurality of frequency bands at corresponding selected sampling rates to obtain samples of each frequency band, means for converting the samples of each frequency band into binary code words, each of said code words containing a corresponding selected plurality of digits, means for dividing the digits in each code word into two groups, one group containing most significant digits and the other group containing least significant digits, means for transmitting the most significant digits in each code word directly to a receiver, means for storing the least significant digits in each code word at the transmitter for the duration of the speech burst from which said least significant digits were derived, and means for transmitting as many as possible of said stored least significant digits during the silent interval next following the speech burst from which the stored least significant digits were derived, and said receiver including:

means for storing said transmitted most significant digits for a first selected constant time period, means for storing said transmitted least significant digits for a second selected time period, said second selected time period being equal to the difference between said first selected constant time period and the duration of the speech burst from which said most and least significant digits were derived in the event that said first selected constant time period exceeds the speech burst duration, and said second selected time period being equal to zero in the event that the speech burst duration exceeds said first selected constant time period, and means for reconstructing a replica of the original speech wave from said stored most and least significant digits.

6. Apparatus for improving the effective transmission rate of speech over a bandwidth limited transmission channel which comprises:

means for dividing an incoming complex speech wave characterized by speech bursts separated by silent intervals into $n$ frequency bands, where $n$ is a selected positive integer equal to or greater than one, means for sampling the $i^{th}$ frequency band at an $i^{th}$ predetermined sampling rate, where $i$ is an integer and $1 \leq i \leq n$, means for encoding each sample of the $i^{th}$ frequency band into a $b_i$-digit binary code word, where $b_i$ is a selected positive integer equal to or greater than one, means for dividing the digits in each $b_i$-digit binary code word into two groups, a first group containing $b_{im}$-most significant digits, where $b_{im}$ is a selected positive integer and $0 \leq b_{im} \leq b_i$, and a second group containing $b_{il}$-least significant digits where $b_{il}$ is a positive integer representing the difference between $b_i$ and $b_{im}$, $$b_{il} = b_i - b_{im}$$

means for transmitting to a receiver the most significant digits in each code word directly and with no delay, storage means for delaying the least significant digits at the transmitter for the duration of the speech burst from which they were derived in the event that the speech burst duration is less than a first selected constant time period, and for discarding each least significant digit which is delayed in said delaying means for said first selected constant time period, means for transmitting to said receiver during silent intervals between speech bursts as many as possible of the least significant digits stored at the transmitter, said receiver, including:

means for storing for said first selected constant time period all the transmitted most significant digits, means for storing the transmitted least significant digits for a variable time period which is equal to the difference between said first selected constant time period and the duration of the speech burst from which the least significant digits were derived in the event that said first selected constant time period exceeds the speech burst duration, and which is equal to zero in the event that the speech burst duration is equal to or exceeds said first selected constant time period, and means for deriving a replica of the original speech wave from the stored most and least significant digits.

7. Apparatus for increasing the effective transmission rate of digital code words representing energy bursts of a speech wave which is characterized by silent intervals between said energy bursts which comprises:

a transmitter including:

means for separating digital code words representing each of said energy bursts into most and least significant parts, means for transmitting to a receiver during each energy burst the most significant part of said digital code words, and means for transmitting to said receiver during the silent interval following each energy burst the least significant part of said digital code words representing said preceding energy burst.

8. In combination with the apparatus defined in claim 7, a receiver including:

means for recombining the transmitted most and least significant parts of said digital code words to form a replica of said speech wave.

9. Apparatus for increasing the effective bit rate of a voice transmission system which comprises:

a transmitter including:

means for dividing a complex speech wave containing speech bursts and silent intervals into two frequency bands, a low band and a high band, means for sampling said low band at a first sampling rate, means for sampling said high band at a second sampling rate, means for encoding each sample of said low band into a binary code word containing a first selected number of digits, means for encoding each sample of said high band into a binary code word containing a second selected number of digits, means for dividing the digits in each code word into two groups, a first group consisting of most significant digits and a second group consisting of least significant digits, means for transmitting said most significant digits to a receiver during a speech burst, means for storing said least significant digits for the duration of the speech burst in which they were derived, and means for transmitting as many as possible of said least significant digits to said receiver during the silent interval following the speech burst in which they were derived thereby increasing the effective bit rate of said voice transmission system, and at said receiver, apparatus including.

means for storing said most significant digits for a selected constant time period, means for storing said least significant digits for a variable time interval, said variable time interval being equal to the difference between said selected constant time period and the duration of the speech burst from which the received least significant digits are derived in the event that the speech burst duration is less than said selected constant time period and said variable time interval being equal to zero in the event that said speech burst duration is equal to or greater than said selected constant time period, means for combining said stored most significant digits with the stored least significant digits to reconstruct the binary code words from which the transmitted digits were derived, means for obtaining from said reconstructed binary code words replicas of said low frequency band and said high frequency band, and means for recombining said low frequency band and said high frequency band to obtain a replica of the original speech wave.

10. Apparatus for increasing the effective bit rate of a voice transmission system containing a transmitter and a receiver, which comprises:

means for dividing a speech wave containing silent intervals between speech bursts into two frequency bands, means for sampling the first of said two frequency bands at a first sampling rate and the second of said two frequency bands at a second sampling rate, means for encoding the samples of said two frequency bands into binary code words containing most and least significant digits,
means for transmitting directly and without delay said most significant digits from said transmitter to said receiver,
means for storing said least significant digits at said transmitter for transmission to the receiver in the silent interval next following the speech burst from which they were derived,
means for transmitting as many as possible of said stored least significant digits to said receiver during the silent interval following the speech burst from which they were derived,
means at said reeciver for delaying said most significant digits for a selected constant time period,
means at said receiver for delaying the received least significant digits for a time period equal to said selected constant time period less the duration of the speech burst from which said least significant digits were derived in the event said speech burst duration is less than said selected constant time period, and for zero time period in the event said speech burst duration is equal to or exceeds said selected constant time period,
means at said receiver for recombining the delayed most and least significant digits from each code word to form a replica of each original code word,
means at said receiver for reconstructing a replica of the orignal speech wave from the series of replica code words derived from said delayed most and least significant digits.

11. Apparatus to increase the effective bit rate of a digitalized voice excited vocoder which comprises:
a transmitter including:
means for dividing a complex speech wave containing silent intervals between speech bursts into an excitation frequency band and a spectrum frequency band,
means for sampling said excitation frequency band at a first sampling rate to derive samples of said excitation frequency band,
means for deriving from said spectrum frequency band a plurality of control signals to be used at a receiver to synthesize a replica of the original speech wave,
means for sampling said control signals at a second sampling rate to derive samples of said control signals, said first and second sampling rates being selected to increase the effective bit rate of said digitalized vocoder,
means for encoding the samples of said excitation frequency band into binary code words containing *n* digits where *n* is a first selected positive integer equal to or greater than one,
means for encoding the samples of said control signals into binary code words containing *m* digits were *m* is a second selected positive integer equal to or greater than one,
means for grouping the digits in each binary code word into groups of most significant digits and least significant digits,
means for transmitting said most significant digits directly and without delay to a receiver,
means for storing said least significant digits at said transmitter for the duration of the speech burst from which they were derived, and
means for transmitting as many as possible of said least significant digits to said receiver at the termination of the speech burst from which they were derived, and said receiver including:
means for storing said most significant digits for a selected constant time period,
means for storing the received least significant digits for a time period equal to the difference between said selected constant time period and the duration of the speech burst from which the least significant digits were derived in the event said speech burst is less than said selected constant time period, and means for storing the received least significant digits for a time period equal to zero in the event that said speech burst is equal to or greater than said selected constant time period,
means for reconstructing replicas of the original excitation frequency band code words and control signal code words from the stored most and least significant digits,
means for generating a replica of said excitation frequency band from said excitation frequency band code words,
means for generating a replica of said control signals from said control signal code words, and
means for synthesizing a replica of the original speech wave from said reconstructed excitation frequency band and from said reconstructed control signals.

12. The method of transmitting a voice signal characterized by silent intervals between speech bursts which comprises dividing the speech wave into a plurality of frequency bands,
sampling said plurality of frequency bands at selected sampling rates,
encoding each sample of each frequency band into a binary code word,
dividing the digits of each binary code word into two groups, the first group consisting of most significant digits and the second group consisting of least significant digits,
transmitting said most significant digits directly and without delay to a receiver,
storing said least significant digits for a variable time period which is equal to said speech burst duration but which does not exceed a selected maximum time period, and
transmitting as many as possible of said least significant digits to said receiver during the silent interval following the speech burst in which said least significant digits were derived.

References Cited

UNITED STATES PATENTS

| | | | |
|---|---|---|---|
| 2,961,492 | 11/1960 | Carbrey et al. | |
| 3,158,693 | 11/1964 | Flanagan --------- | 179—15.55 |

ROBERT L. GRIFFIN, *Primary Examiner.*

J. T. STRATMAN, *Assistant Examiner.*